(12) United States Patent
Pietras et al.

(10) Patent No.: US 8,256,444 B2
(45) Date of Patent: Sep. 4, 2012

(54) CHECK BALL VALVE ASSEMBLY WITH CHECK BALL GUIDE

(75) Inventors: Kelly Pietras, Oakland Township, MI (US); Constantin Dumitru, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 342 days.

(21) Appl. No.: 12/614,107

(22) Filed: Nov. 6, 2009

(65) Prior Publication Data

US 2011/0108141 A1    May 12, 2011

(51) Int. Cl.
*G05D 7/01*    (2006.01)

(52) U.S. Cl. ............... 137/112; 137/111; 137/247.21; 137/533.11

(58) Field of Classification Search ........... 137/111, 137/112, 113, 247.21, 533.11, 533.13, 533.15
See application file for complete search history.

(56) References Cited

U.S. PATENT DOCUMENTS

| | | | | |
|---|---|---|---|---|
| 315,521 A * | 4/1885 | Dailey | ........................... | 137/113 |
| 1,675,231 A * | 6/1928 | Stoke | ........................... | 222/205 |
| 1,700,234 A * | 1/1929 | McCrosky | ........................... | 137/533.11 |
| 1,938,369 A * | 12/1933 | Beebe | ........................... | 137/113 |
| 3,437,065 A * | 4/1969 | Robbins, Jr. | ........................... | 114/330 |
| 3,444,881 A * | 5/1969 | Harper | ........................... | 137/112 |
| 3,509,900 A * | 5/1970 | McCracken et al. | ........................... | 137/112 |
| 3,520,319 A * | 7/1970 | McCracken et al. | ........................... | 137/111 |
| 3,900,230 A * | 8/1975 | Durling | ........................... | 303/84.2 |
| 3,945,784 A * | 3/1976 | Collins | ........................... | 425/130 |
| 3,972,343 A * | 8/1976 | Burge | ........................... | 137/112 |
| 4,162,146 A * | 7/1979 | Seibert | ........................... | 96/113 |
| 4,230,174 A * | 10/1980 | Eubank | ........................... | 165/58 |
| 6,446,656 B1 * | 9/2002 | Franks | ........................... | 137/112 |
| 7,165,571 B1 * | 1/2007 | Buzdum | ........................... | 137/112 |
| 2010/0206404 A1 * | 8/2010 | Morrison et al. | ........................... | 137/533.15 |

FOREIGN PATENT DOCUMENTS

GB    2222230 A  *  2/1990

* cited by examiner

*Primary Examiner* — Eric Keasel
*Assistant Examiner* — Minh Le

(57) ABSTRACT

A check ball valve assembly is used to regulate fluid flow from two separate fluid sources to a single fluid outlet. The assembly utilizes a single check ball alternating between two check ball seats in two separate fluid passages. A check ball guide is installed at the intersection of the separate fluid passages and deflects the check ball from the pressurized passage to the non-pressurized passage to prevent backflow into the fluid source.

20 Claims, 5 Drawing Sheets

CHECK BALL VALVE ASSEMBLY WITH CHECK BALL GUIDE

FIELD

The present disclosure relates to a check ball valve assembly, and more particularly to a check ball valve assembly having a check ball guide for regulating fluid flow from multiple sources and supplying fluid to a single outlet.

BACKGROUND

The statements in this section merely provide background information related to the present disclosure and may or may not constitute prior art.

In pressurized fluid systems, check ball valves are used to regulate fluid flow by allowing flow in one direction while blocking flow in the opposite direction. Typically, a check ball valve includes a check ball and a ball seat. When pressurized fluid flows in the direction away from the ball seat, the check ball is forced off the ball seat and the fluid flows between the check ball and the inner surface of the fluid passage. When the pressurized fluid flows toward the ball seat, the check ball is forced against the ball seat, sealing off any opening for fluid to pass around the ball. The ball is further contained in the fluid passage by a cage or other obstruction that keeps the ball from traveling into an outlet passage while otherwise providing an open cross-sectional area to allow the pressurized fluid to flow to the outlet passage.

Some pressurized fluid systems may require multiple pressurized fluid sources for the purpose of, for example, backing-up a failed pressurized fluid source. When incorporating multiple pressurized fluid sources that feed a single fluid outlet, it may be desirable to prevent fluid flow into the secondary, non-pressurized fluid source when the primary fluid source is pressurized. The same protection may be required when the primary fluid source is not functioning and the secondary source is pressurized. Previously, a system capable of these functions requires two check ball valves to provide backflow prevention into the non-pressurized fluid source. The two check ball valves require twice the packaging space as a single check ball valve. Furthermore, the two check ball valves would not coordinate directly with each other and may require additional time for the check ball valves to perform their functions. Additional parts and manufacturing steps also increase the cost of the system while decreasing its reliability. While these fluid systems are effective, there is room in the art for an apparatus for controlling the flow of pressurized fluid from multiple sources to a single outlet.

SUMMARY

A ball check valve assembly for regulating fluid flow from a plurality of fluid pressure sources according to the principles of the present invention is provided. In one embodiment, the check ball valve assembly includes a check ball and a first fluid passage in communication with a first of the plurality of fluid pressure sources. The first fluid passage includes a check ball seat. The assembly further includes a second fluid passage in communication with a second of the plurality of fluid pressure sources. The second fluid passage intersects the first fluid passage and includes a check ball seat. The assembly further includes a third fluid passage in communication with the first and second fluid passages. The third fluid passage receives fluid flow from one of the first and second fluid passages. The assembly further includes an intersection fluid passage in communication with the first, second and third fluid passages and a check ball guide disposed in the intersection fluid passage.

In one aspect of the present invention, the check ball seat of the first fluid passage has a smaller inner diameter than the diameter of the check ball.

In another aspect of the present invention, the check ball seat of the second fluid passage has a smaller inner diameter than the diameter of the check ball.

In yet another aspect of the present invention, the check ball is disposed in at least one of a first position, a second position, and moving between the first and second positions wherein the first position is adjacent to the check ball seat of the first fluid passage, the second position is adjacent to the check ball seat of the second fluid passage.

In yet another aspect of the present invention, the intersection fluid passage includes an inner surface. The check ball guide includes an arcuate portion disposed on the inner surface of the intersection fluid passage.

In yet another aspect of the present invention, the arcuate portion includes a first end and a second end wherein the first end is disposed proximate the first fluid passage and the second end is disposed proximate the second fluid passage.

In yet another aspect of the present invention, the check ball guide includes an arcuate portion having a first end and a second end, wherein the first end is disposed proximate the first fluid passage and the second end is disposed proximate the second fluid passage, and wherein the arcuate portion bisects the intersection fluid passage.

In yet another aspect of the present invention, the check ball valve assembly further includes a check ball guide insert. The check ball insert includes the third fluid passage and the check ball guide.

In yet another aspect of the present invention, the check ball guide insert further includes a flexible retention tab.

In yet another aspect of the present invention, the check ball valve assembly further includes a retention tab. The check ball guide insert further includes a notch corresponding to a retention tab of the check ball valve assembly.

In yet another aspect of the present invention, the first fluid passage is provided with fluid pressure from a first fluid pump and the second fluid passage is provided with fluid pressure from a second fluid pump.

Further objects, aspects and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figure 1:
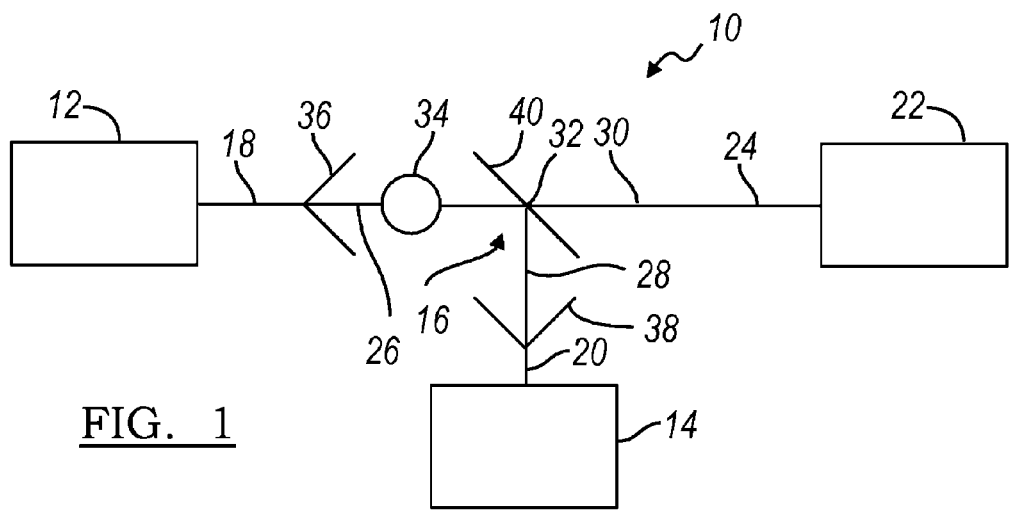
FIG. 1 is a schematic of an exemplary pressurized fluid passage system having a check ball fluid assembly according to the present disclosure.

Referring to the drawings, wherein like reference numbers refer to like components, in FIG. 1 a schematic of an exemplary embodiment of a fluid passage system 10 is illustrated. The fluid passage system 10 includes a first source of pressurized fluid 12 and a second source of pressurized fluid 14. The first and second sources of pressurized fluid 12 and 14 may include, for example, positive displacement pumps, hydraulic circuits having pressurized fluid flow, pressure regulation valves, accumulators, or any other source of pressurized fluid. The first source of pressurized fluid 12 communicates a fluid to a ball check valve assembly 16 via a first fluid passage 18 and the second source of pressurized fluid 14 communicates a fluid to the ball check valve assembly 16 via a second fluid passage 20. The ball check valve assembly 16 is operable to selectively communicate fluid flow from one of the first and second fluid sources 12 and 14 to a fluid output 22 via a third fluid passage 24. The fluid output 22 may be, for example, a hydraulic fluid control circuit for a transmission.

The ball check valve assembly 16 generally includes a junction of three valve fluid passages including a first fluid valve passage 26, a second fluid valve passage 28, and a third fluid valve passage 30. The first fluid valve passage 26 is in communication with the first fluid passage 18. The second fluid valve passage 28 is in communication with the second fluid passage 20. The third fluid valve passage 30 is in communication with the third fluid passage 24. The first, second, and third fluid valve passages 26, 28, and 30 each communicate with each other at an intersection 32. A check ball 34 is disposed within the first, second, and third fluid valve passages 26, 28, and 30. The check ball 34 is contained in the first fluid valve passage 28 by a first check ball seat 36 disposed at the connection between the first fluid passage 18 and the first fluid valve passage 26. The check ball 34 is contained in the second fluid valve passage 28 by a second check ball seat 38 disposed at the connection between the second fluid passage 20 and the second fluid valve passage 28. The arrangement prevents the check ball 34 from traveling beyond the first and second check ball seats 36, 38 and into the first and second fluid sources 12, 14. A check ball guide 40 is disposed either at the intersection 32 or within the third fluid valve passage 30. The check ball guide 40 operates, upon pressurization of either the first or second fluid passages 18, 20, to deflect the check ball 34 into the non-pressurized first or second fluid passage 18, 20 while allowing the pressurized fluid to pass through the check ball guide 40 to the third fluid passage 24.

Figure 2:
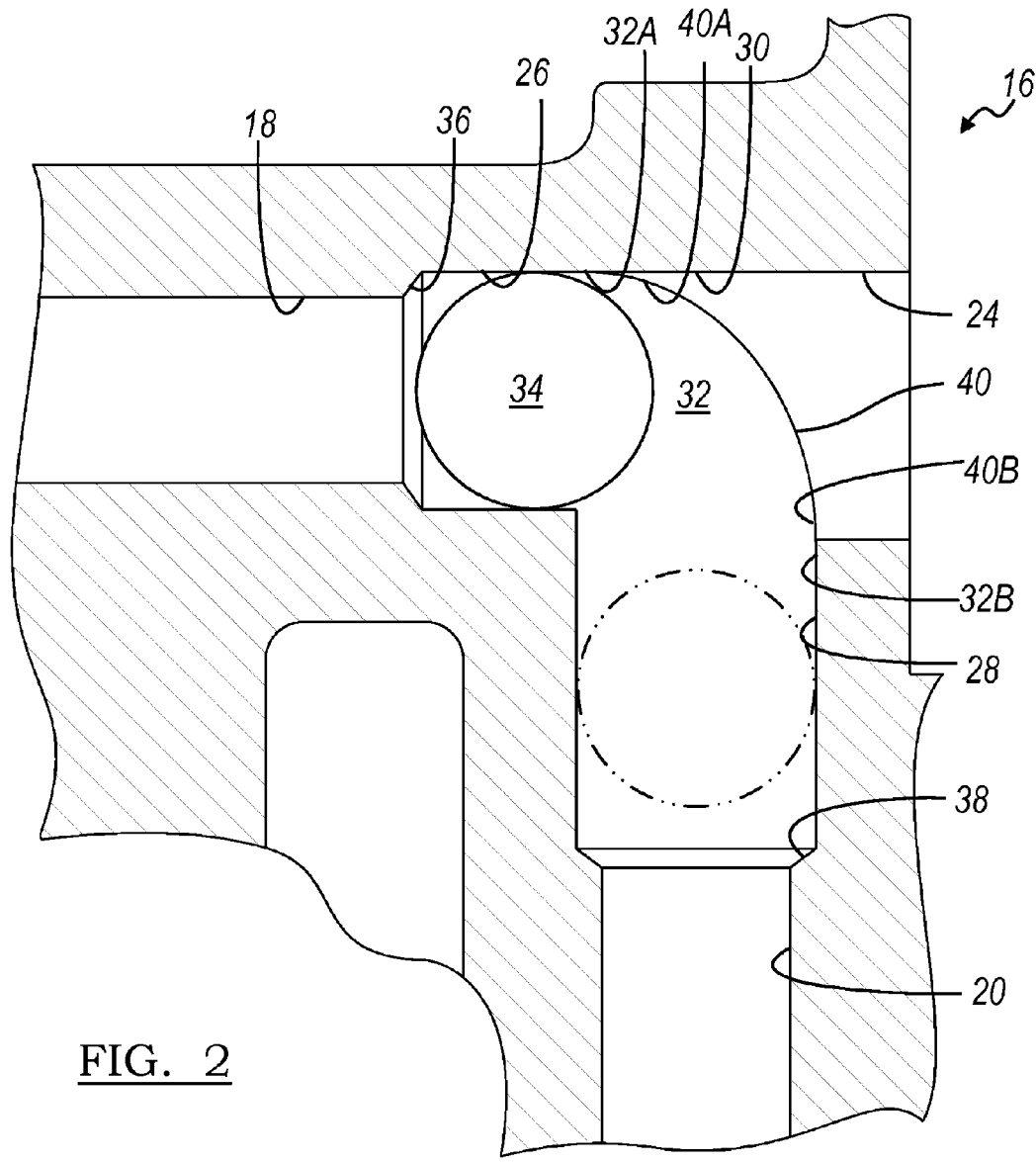
FIG. 2 is a cross-section view of an example of the check ball fluid assembly according to the present disclosure.

Referring now to FIG. 2, a cross-section of an exemplary embodiment of the check ball valve assembly 16 is illustrated. The first fluid passage 18 is shown in communication with the first valve fluid passage 26. The first check ball seat 36 is disposed at the connection of the first fluid passage 18 and the first valve fluid passage 26. The second fluid passage 20 is shown in communication with the second valve fluid passage 28. The second check ball seat 38 is disposed at the connection of the first fluid passage 20 and the first valve fluid passage 28. The fluid passages 18, 20 have a smaller diameter than the valve fluid passages 26, 28. The check ball seats 36, 38 form a portion of a conical surface to join the inner surfaces of the fluid passages 18, 20 to the inner surfaces of the valve fluid passages 26, 28. The check ball 34 is disposed in the valve fluid passages 26, 28 and has a larger diameter than the fluid passages 18, 20. The check ball 34 travels between the first and second check ball seats 36, 38, as will be described in greater detail below.

The check ball guide 40 is disposed in the intersection 32 or in the third fluid passage 24. In the example shown, the check ball guide 40 is a gradual reduction in the diameter of the intersection 32 or third fluid passage 24 in an arc from a first end 40A of the ball check guide 40 to a second end 40B of the ball check guide 40. The first end 40A is disposed proximate a surface 32A opposite the second valve fluid passage 28. The second end 40B of the check ball guide 40 is disposed proximate a surface 32B which is adjacent the second valve fluid passage 28. When the first fluid source 12 is pressurized, the pressurized fluid forces the check ball 34 from a first position in the check ball seat 36 and carries the check ball 34 through the first valve fluid passage 26 towards the third valve fluid passage 30. Before the check ball 34 passes into the third valve fluid passage 30, the check ball 34 enters the intersection 32 containing the check ball guide 40. The check ball 34 is deflected or guided by the check ball guide 40 into the second valve fluid passage 28 and is propelled further into a second position in the second check ball seat 38 by the pressurized fluid of the first fluid source 12. The reduced diameter of the check ball guide 40 prevents the check ball 34 from entering the third fluid passage 24. In addition, due to the curved or arcuate shape of the ball check guide 40 from the end 40A to the end 40B, the check ball 34 is prevented from seating or blocking the third fluid passage 24. After the check ball 34 is seated in the second check ball seat 38, the pressurized fluid flows without obstruction to the third fluid passage 24. The check ball 34 actuation is repeated in reverse when the second fluid source 14 becomes pressurized and the first fluid source 12 is depressurized. The pressurized fluid from the second fluid source 14 forces the check ball 34 from the second position in the second check ball seat 38 and carries the check ball 34 through the second valve fluid passage 28 towards the third valve fluid passage 30. Before the check ball 34 passes into the third valve fluid passage 30, the check ball 34 enters the intersection 32 containing the check ball guide 40. The check ball 34 is deflected or guided by the check ball guide 40 into the first valve fluid passage 26 and is propelled further into the first position in the first check ball seat 36 by the pressurized fluid of the first fluid source 12.

Figures 3, 4:
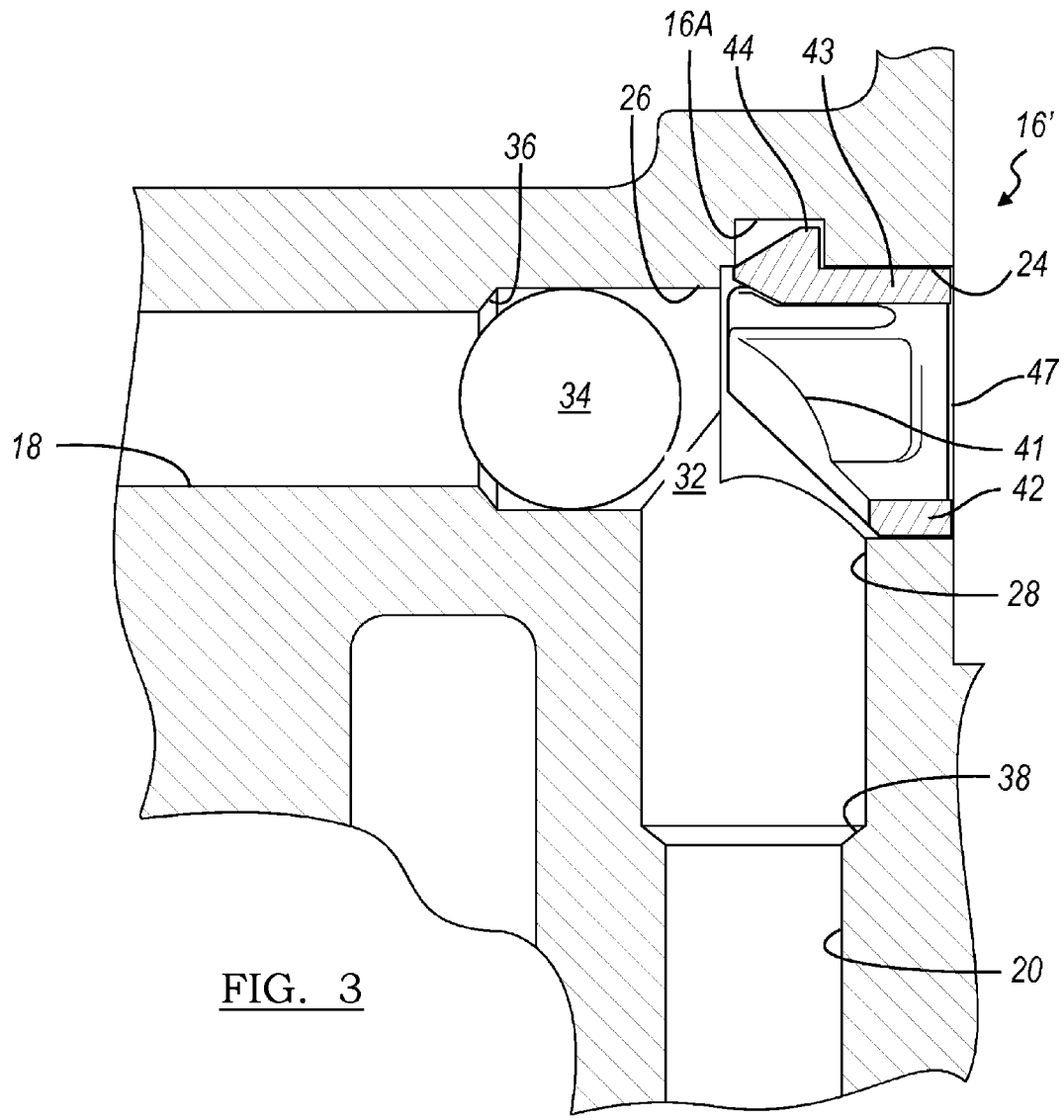
FIG. 3 is a cross-section of another example of the check ball fluid assembly having an exemplary check ball guide insert according to the present disclosure.
FIG. 4 is front view of an example of a check ball guide insert according to the present disclosure.

Referring now to FIG. 3, a cross-section of another example of the check ball valve assembly 16' is illustrated. The check ball valve assembly 16' is similar to the check ball valve assembly 16 described in FIG. 1 and therefore like components are indicated by like reference numbers. However, the check ball guide 40 of the check ball valve assembly 16 has been replaced with a check ball guide insert 42. The check ball guide insert 42 is a replaceable part that may be readily replaced when desired. The check ball guide insert 42 has a hollow cylindrical body 43 and is disposed in the third fluid passage 24. The check ball guide insert 42 includes a first open end 45 that communicates with the fluid passages 26 and 28 and a second open end 47 that communicates with the fluid passage 24. The check ball guide insert 42 includes a check ball guide 41 and a check ball guide retention tab 44. The retention tab 44 is disposed on the outer periphery of the check ball guide insert 42. The retention tab 44 is flexible and coordinates with a groove 16A located within the third fluid passage 24 of the ball valve assembly 16' to lock the check ball guide insert 42 into the ball valve assembly 16'. As the check ball guide insert 42 is placed inside the check ball valve assembly 16, the flexible retention tab 44 initially deflects to clear the inner diameter of the check ball valve assembly 16 and snaps into the groove 16A when the check ball guide insert 42 is seated in the check ball valve assembly 16. However, it should be appreciated that other methods and mechanisms for retaining the check ball guide insert 42 into the ball valve assembly 16' may be employed without departing from the scope of the present invention.

Figure 5:
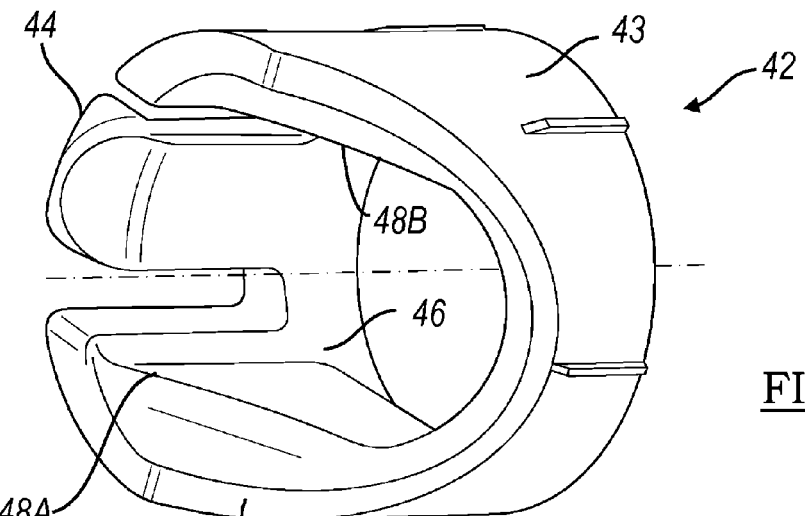
FIG. 5 is a perspective view of another example of a check ball guide insert according to the present disclosure.
Figure 6:
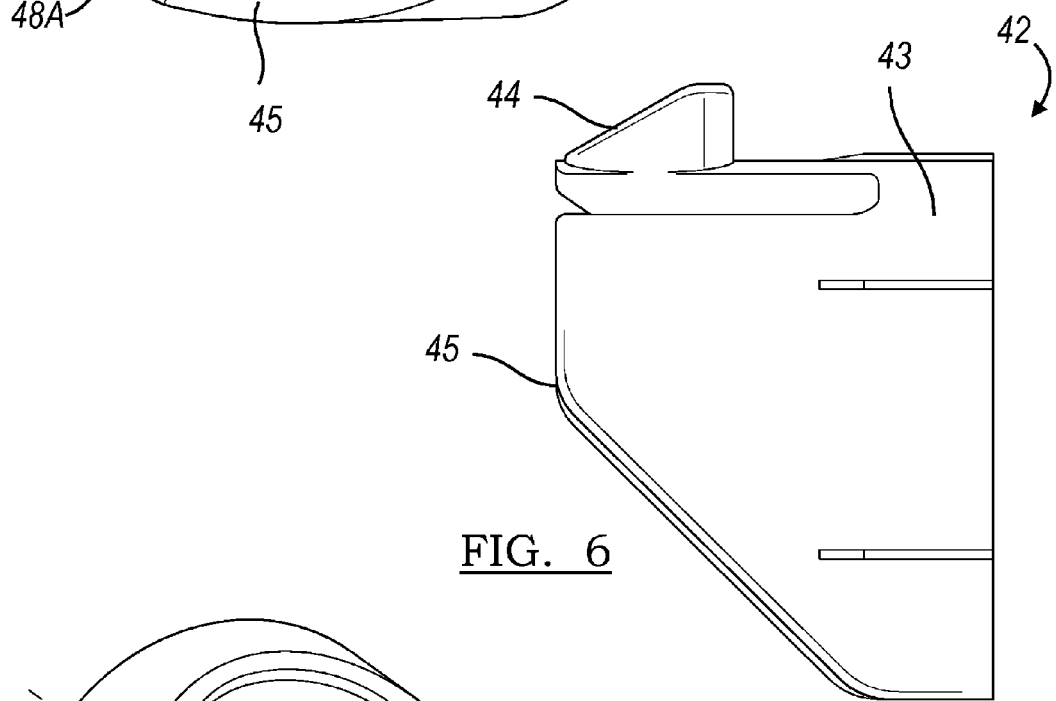
FIG. 6 is a cross-section view of the check ball guide insert shown in FIG. 5 according to the present disclosure.
Figure 7:
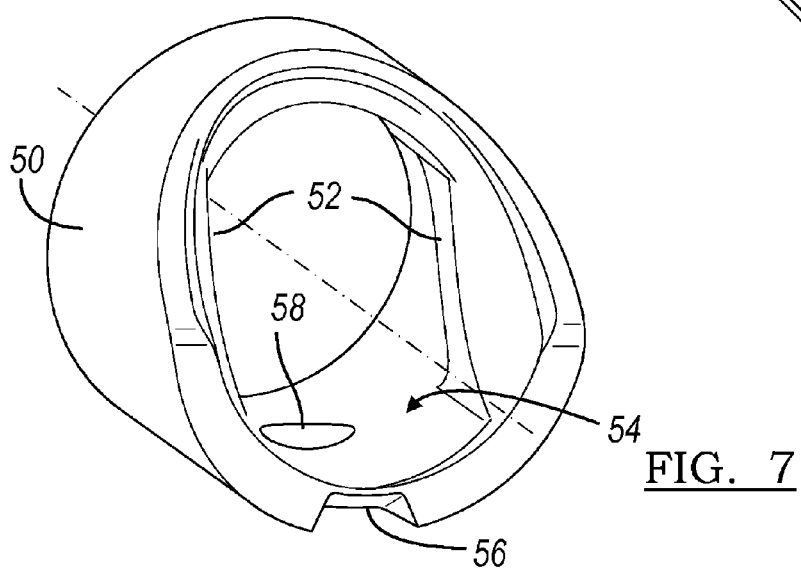
FIG. 7 is a perspective view of another example of a check ball guide insert according to the present disclosure.

Referring now to FIGS. 4-6, the check ball guide 41 is defined by an interior surface 46 within the hollow body 43. More specifically, the check ball guide 41 is defined by a pair of arcuate projections 48A, 48B disposed opposite each other on the inner surface 46 near the open end 45. The check ball guide 41 effectively forms a track which receives and redirects the check ball 34 while allowing the pressurized fluid to flow through the check ball guide 41 between the arcuate projections 48A, 48B and into the third fluid passage 24. The check ball guide insert 42 prevents the check ball 34 from entering the third fluid passage 24. In addition, the check ball guide insert 42 prevents the check ball 34 from seating or blocking the third fluid passage 24. Turning to FIG. 7, an alternate embodiment of a check ball guide insert is generally indicated by reference number 50. The check ball guide insert 50 includes a check ball guide 52 and a retention feature 54 having an alignment indentation 56 and a retention tab receiving hole 58. More specifically, the alignment indentation 56 receives an orientation and retention tab of a ball valve assembly (not shown). As the check ball guide insert 52 is moved into position, the retention tab is deflected into the retention tab receiving hole 58 by the alignment indentation 56. This feature provides proper orientation and retention of the check ball guide 52 when installed in the check ball valve assembly (not shown).

Figure 8:
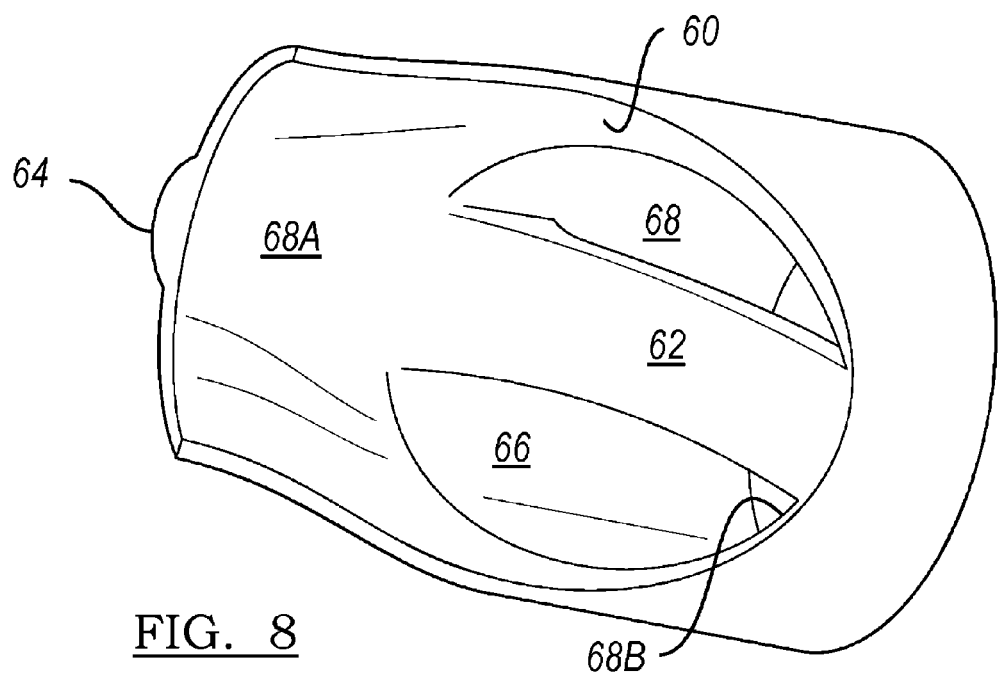
FIG. 8 is a perspective view of another example of a check ball guide insert according to the present disclosure.
Figure 9:
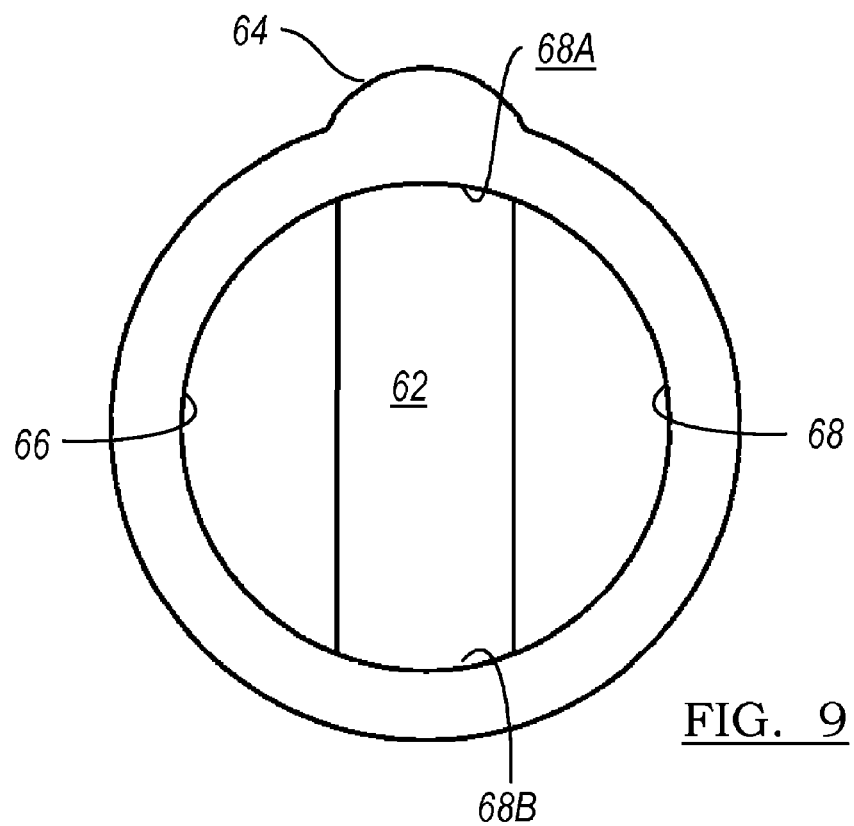
FIG. 9 is a front view of the check ball guide insert shown in FIG. 8.

With reference to FIGS. 8 and 9, another example of a check ball guide insert is indicated by reference number 60. The check ball guide insert 60 includes a check ball guide 62, an orientation key 64 and an inside surface 66 that communicates with the third fluid passage 24 of the check ball valve assembly (not shown). The check ball guide 62 is an arcuate member that spans and bisects the inside bore 66 from a first surface 68A of the third fluid passage 68 to a second surface 68B of the third fluid passage 68. The orientation key 64 is a projection on an outer surface 60A of the check ball guide insert 60 that coordinates with a key groove of the ball valve assembly (not shown). The orientation key 64 provides proper orientation of the check ball guide 62 when installed in the check ball valve assembly.

Figure 10:
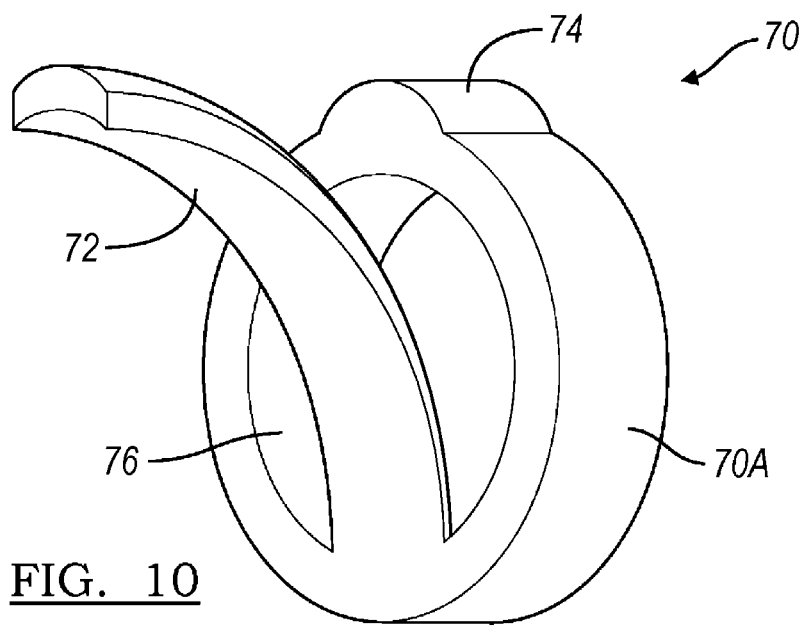
FIG. 10 is a perspective view of another example of a check ball guide insert according to the present disclosure.

With reference to FIG. 10, another example of a check ball guide insert is indicated by reference number 70. The check ball guide insert 70 includes a check ball guide 72, an orientation key 74 and an inside surface 76 that communicates with the third fluid passage 24 of the check ball valve assembly (not shown). The check ball guide 72 is an arcuate member that spans and bisects the inside bore 76. The orientation key 74 is a projection on an outer surface 70A of the check ball guide insert 70 that coordinates with a key groove of the ball valve assembly (not shown). The orientation key 74 provides proper orientation of the check ball guide 72 when installed in the check ball valve assembly.

Figure 11:
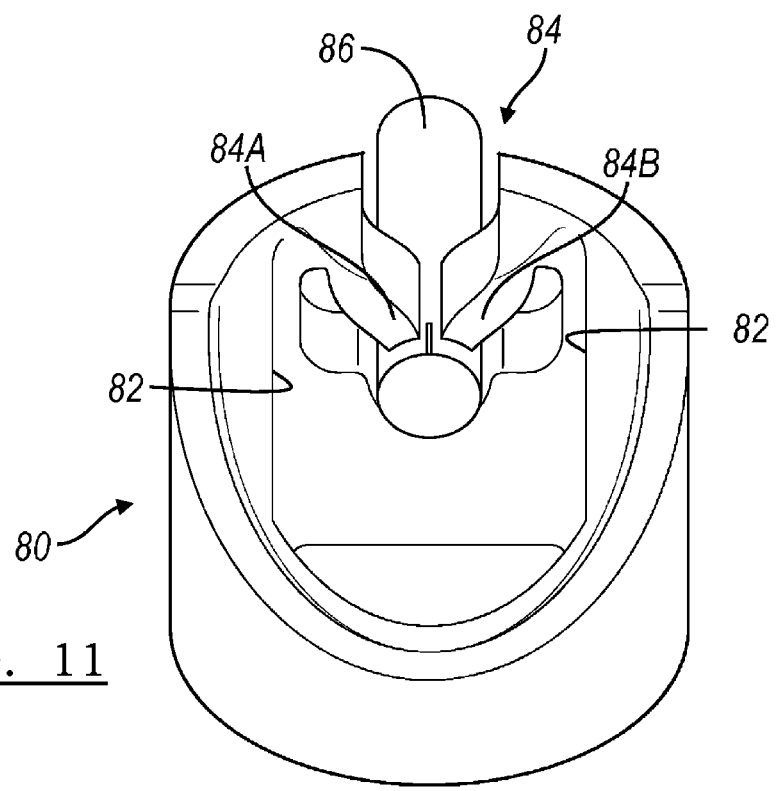
FIG. 11 is a perspective view of another example of a check ball guide insert according to the present disclosure.

Turning to FIG. 11, another example of a check ball guide insert is generally indicated by reference number 80. The check ball guide insert 80 includes a check ball guide 82 and a retention feature 84 having a pair of flexible alignment and retention tabs 84A, 84B. More specifically as the check ball guide insert 80 is moved into position, the alignment and retention tabs 84A, 84B guide a post 86 that is fixed to a check ball valve assembly (not shown). The post 86 forces the alignment and retention tabs 84A, 84B to flex around the post 86 and lock the check ball guide insert 80 into place. This feature provides proper orientation and retention of the check ball guide 80 when installed in the check ball valve assembly (not shown).

The check ball valve assembly 16, 16' of the present invention provides a fast response valve system having fewer parts than would be required utilizing previous technology. The check ball valve assembly 16, 16' also requires less packaging space so that it can be combined with other features in a pressurized fluid system in a smaller and more compact unit. Additionally, the ability to remove and replace the check ball guide insert 42, 50, 60, 70, 80 provides for longer life of the check ball valve assembly 16 by providing the ability to replace worn or damaged parts.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:

1. A check ball valve assembly for regulating fluid flow from a plurality of fluid pressure sources, the valve assembly comprising:
   a check ball;
   a first fluid passage in communication with a first of the plurality of fluid pressure sources, wherein the first fluid passage includes a check ball seat;
   a second fluid passage in communication with a second of the plurality of fluid pressure sources, wherein the second fluid passage intersects the first fluid passage and includes a check ball seat;
   a third fluid passage in communication with the first and second fluid passages, and wherein the third fluid passage receives fluid flow from one of the first and second fluid passages;
   an intersection fluid passage in communication with the first, second and third fluid passages; and
   a check ball guide insert including a check ball guide, wherein the check ball guide insert is at least partially disposed within the third fluid passage and the a check ball guide is disposed in the intersection fluid passage.

2. The check ball valve assembly of claim 1 wherein check ball seat of the first fluid passage has a smaller inner diameter than the diameter of the check ball.

3. The check ball valve assembly of claim 2 wherein check ball seat of the second fluid passage has a smaller inner diameter than the diameter of the check ball.

4. The check ball valve assembly of claim 3 wherein the check ball is disposed in at least one of a first position, a second position, and moving between the first and second positions wherein the first position is adjacent to the check ball seat of the first fluid passage, the second position is adjacent to the check ball seat of the second fluid passage.

5. The check ball valve assembly of claim 3 wherein the intersection fluid passage includes an inner surface and wherein the check ball guide includes an arcuate portion disposed on the inner surface of the intersection fluid passage.

6. The check ball valve assembly of claim 5 wherein the arcuate portion includes a first end and a second end wherein the first end is disposed proximate the first fluid passage and the second end is disposed proximate the second fluid passage.

7. The check ball valve assembly of claim 3 wherein the check ball guide includes an arcuate portion having a first end and a second end, wherein the first end is disposed proximate the first fluid passage and the second end is disposed proximate the second fluid passage, and wherein the arcuate portion bisects the intersection fluid passage.

8. The check ball valve assembly of claim 1 wherein the check ball guide insert further includes a flexible retention tab.

9. The check ball valve assembly of claim 1 further including a retention tab and wherein the check ball guide insert further includes a notch corresponding to a retention tab of the check ball valve assembly.

10. The fluid passage valve assembly of claim 1 further wherein the first fluid passage is provided with fluid pressure from a first fluid pump and the second fluid passage is provided with fluid pressure from a second fluid pump.

11. A check ball valve assembly for regulating fluid flow from a plurality of fluid pressure sources, the valve assembly comprising:
 a check ball;
 a first fluid passage in communication with a first of the plurality of fluid pressure sources, wherein the first fluid passage includes a check ball seat;
 a second fluid passage in communication with a second of the plurality of fluid pressure sources, wherein the second fluid passage intersects the first fluid passage and includes a check ball seat;
 a third fluid passage in communication with the first and second fluid passages, and wherein the third fluid passage receives fluid flow from one of the first and second fluid passages;
 an intersection fluid passage in communication with the first, second and third fluid passages; and
 a check ball guide insert including a check ball guide wherein the check ball guide insert is at least partially disposed within the third fluid passage and the check ball guide is disposed in the intersection fluid passage; and
 wherein the check ball is disposed in at least one of a first position, a second position, and moving between the first and second positions wherein the first position is adjacent to the check ball seat of the first fluid passage, the second position is adjacent to the check ball seat of the second fluid passage; and
 wherein the first fluid passage is provided with fluid pressure from a first fluid pump and the second fluid passage is provided with fluid pressure from a second fluid pump.

12. The check ball valve assembly of claim 11 wherein check ball seat of the first fluid passage has a smaller inner diameter than the diameter of the check ball and the check ball seat of the second fluid passage has a smaller inner diameter than the diameter of the check ball.

13. The check ball valve assembly of claim 11 wherein the intersection fluid passage includes an inner surface, wherein the check ball guide includes an arcuate portion disposed on the inner surface of the intersection fluid passage and wherein the arcuate portion includes a first end and a second end wherein the first end is disposed proximate the first fluid passage and the second end is disposed proximate the second fluid passage.

14. The check ball valve assembly of claim 11 wherein the check ball guide includes an arcuate portion having a first end and a second end, wherein the first end is disposed proximate the first fluid passage and the second end is disposed proximate the second fluid passage, and wherein the arcuate portion bisects the intersection fluid passage.

15. The check ball valve assembly of claim 11 wherein the check ball guide insert further includes a flexible retention tab.

16. The check ball valve assembly of claim 11 further including a retention tab and wherein the check ball guide insert further includes a notch corresponding to a retention tab of the check ball valve assembly.

17. A check ball valve assembly for regulating fluid flow from a plurality of fluid pressure sources, the valve assembly comprising:
 a check ball;
 a first fluid passage in communication with a first of the plurality of fluid pressure sources, wherein the first fluid passage includes a check ball seat;
 a second fluid passage in communication with a second of the plurality of fluid pressure sources, wherein the second fluid passage intersects the first fluid passage and includes a check ball seat;
 a third fluid passage in communication with the first and second fluid passages, and wherein the third fluid passage receives fluid flow from one of the first and second fluid passages;
 an intersection fluid passage in communication with the first, second and third fluid passages; and
 a check ball guide insert including a check ball guide wherein the check ball guide insert is at least partially disposed within the third fluid passage and the check ball guide is disposed in the intersection fluid passage; and
 wherein the check ball is disposed in at least one of a first position, a second position, and moving between the first and second positions wherein the first position is adjacent to the check ball seat of the first fluid passage, the second position is adjacent to the check ball seat of the second fluid passage; and
 wherein the first fluid passage is provided with fluid pressure from a first fluid pump and the second fluid passage is provided with fluid pressure from a second fluid pump.

18. The check ball valve assembly of claim 17 wherein the intersection fluid passage includes an inner surface, wherein the check ball guide includes an arcuate portion disposed on the inner surface of the intersection fluid passage and wherein the arcuate portion includes a first end and a second end wherein the first end is disposed proximate the first fluid passage and the second end is disposed proximate the second fluid passage.

19. The check ball valve assembly of claim 17 wherein the check ball guide includes an arcuate portion having a first end and a second end, wherein the first end is disposed proximate the first fluid passage and the second end is disposed proximate the second fluid passage, and wherein the arcuate portion bisects the intersection fluid passage.

20. The check ball valve assembly of claim 17 wherein the check ball guide insert further includes a flexible retention feature.

* * * * *